US005818914A

United States Patent [19]
Fujisaki

[11] Patent Number: 5,818,914
[45] Date of Patent: Oct. 6, 1998

[54] AUCTION INFORMATION TRANSMISSION PROCESSING SYSTEM

[75] Inventor: Kiyotaka Fujisaki, Tokyo, Japan

[73] Assignee: Aucnet Inc., Tokyo, Japan

[21] Appl. No.: 410,898

[22] Filed: Mar. 27, 1995

[30] Foreign Application Priority Data

Dec. 7, 1994 [JP] Japan .................................... 6-331213

[51] Int. Cl.[6] .................................................... H04M 11/00

[52] U.S. Cl. ..................................... 379/93.12; 379/93.01

[58] Field of Search ..................................... 395/212, 226, 395/227, 235, 237; 348/13–16, 10; 379/90, 93, 96, 90.01, 93.01, 93.05, 93.08, 93.12, 93.13, 93.17, 93.21, 93.25; 705/12, 26, 27, 35, 37

[56] References Cited

U.S. PATENT DOCUMENTS

| | | | |
|---|---|---|---|
| 4,347,498 | 8/1982 | Lee et al. | 340/825.02 |
| 4,763,329 | 8/1988 | Green | 371/11 |
| 4,789,928 | 12/1988 | Fujisaki | 364/401 |
| 4,882,743 | 11/1989 | Mahmoud | 348/15 |
| 4,903,201 | 2/1990 | Wagner | 364/408 |
| 4,974,252 | 11/1990 | Osborne | 348/14 |
| 4,980,826 | 12/1990 | Wagner | 364/408 |
| 5,038,284 | 8/1991 | Kramer | 364/408 |
| 5,077,665 | 12/1991 | Silverman et al. | 364/408 |
| 5,136,501 | 8/1992 | Silverman et al. | 364/408 |
| 5,235,680 | 8/1993 | Bijnagte | 395/161 |
| 5,414,773 | 5/1995 | Handelman | 348/10 |
| 5,539,450 | 7/1996 | Handelman | 348/13 |

FOREIGN PATENT DOCUMENTS

| | | |
|---|---|---|
| 0583196A1 | 8/1993 | European Pat. Off. . |
| WO 9215174 | 9/1992 | WIPO . |

*Primary Examiner*—Jason Chan
*Attorney, Agent, or Firm*—Sughrue, Mion, Zinn, Macpeak & Seas, PLLC

[57] ABSTRACT

An auction information transmission processing system in an auction information transmission system which is constructed by connecting a single most significant front computer to a host computer, connecting a plurality of intermediate front computers and a plurality of least significant front computers to the most significant front computer in a tree-like configuration via communication lines, and connecting a plurality of dealer terminals to each of the least significant front computers via communication lines. The host computer connects to a satellite signal transmitter for transmitting auction data signals and other signals to a satellite through a satellite communication line, and each dealer terminal is provided with a satellite signal receiver for receiving the signals transmitted from the host computer through the satellite communication line.

14 Claims, 7 Drawing Sheets

AUCTION INFORMATION TRANSMISSION PROCESSING SYSTEM

BACKGROUND OF THE INVENTION

The present invention relates to an auction information transmission processing system which enables individuals scattered over a wide area to participate in an auction on a real-time basis without gathering at an auction site.

Conventionally, auctions of used cars or the like require that used cars to be presented at the auction by a participant be brought to the auction site by overland or other transportation means.

An auction system by which articles such as used cars can be auctioned automatically is available and includes an auction data processor installed at the auction site for processing predetermined data relating to the used cars to be presented at the auction, as well as data relating to the registered members of the auction group, display units installed at prescribed locations of the auction site for displaying various items of auction information, and bidding buttons also available at these locations so that they can be operated by those participating in the auction. A participant presses the bidding buttons while observing the auction information that appears on the screen of the display unit, thereby issuing a bid-up signal that is then processed by the auction data processor. In this manner a successful bidder can be determined automatically.

A problem with this conventional auctioning method in which participants bring the used cars to the auction site is that effort must be exerted to transport the cars to the site. In addition, though the conventional system automates the auctioning of the used cars in the manner described, it is still necessary for the participants to be present at the auction site.

A conceivable alternative to the foregoing would be to construct a system in which a host computer is connected directly to a number of dealer terminals via the leased telecommunication lines or commercial telephone lines of, for example, the Nippon Telephone & Telegraph Corp. (NTT) or the American Telegraph & Telephone Co., Ltd. (AT&T). The system could then be used to carry out an auction by making it possible to transmit a variety of auction data between the host computer and the dealer terminals. With such a system, however, a huge amount of auction data, such as the data relating to the articles being auctioned, must be transmitted over the leased telecommunication lines and commercial telephone lines, and too much time would be required to transmit the data. Since this would make the instantaneous transmission of constantly changing auction data difficult, it would not be possible to hold the auction on a real-time basis.

The above drawbacks accompanying the conventional system have partially been overcome by an auction information transmission processing system which enables individuals dispersed over a wide area to participate in an auction without gathering at the auction site, as disclosed in commonly owned U.S. Pat. No. 4,789,928.

Specifically, U.S. Pat. No. 4,789,928 describes an information transmission processing system in an auction information transmission system constructed by connecting a single most significant front computer to a host computer, connecting a plurality of intermediate front computers and a plurality of least significant front computers to the most significant front computer in a tree-like configuration via communication lines, and connecting a plurality of dealer terminals to each of the least significant front computers via communication lines. Each dealer terminal has basic pattern data storage means storing pattern data indicative of a basic display screen picture and exhibit data storage means storing data peculiar to articles on exhibit at the auction.

In the operation of this system, when the system is started up, the host computer transmits a line connection signal to the front computers, whereby the host computer is connected to each of the front computers. The host computer then transmits auction data such as member registration data to the least significant front computers, and the data are stored in these computers. Further, the least significant front computers are connected to the dealer terminals, and data are extracted from the basic pattern storage means and exhibit data storage means of the dealer terminals, and these data are displayed on the corresponding display screen, in response to a command from the host computer. The front computers select a predetermined number of bid-up signals input thereto in a predetermined period of time and bid up the price of the article being auctioned. After bidding starts, each front computer selects a predetermined number of bid-up signals from each dealer terminal in a predetermined period of time and transmits these signals to the front computer of higher significance. The most significant front computer selects a predetermined number of bid-up signals input thereto in a predetermined period of time and bids up the price. A pledge is deemed to be made when the price reaches a preregistered sell-off price or in response to a sell-off signal issued by a seller. The least significant front computers identify members, who have issued bid-up signals at the time of a pledge, based on member registration data, and data indicative of these members are transmitted to the front computers of higher significance to decide a successful bidder.

However, the system described in U.S. Pat. No. 4,789,928 still suffers from problems as discussed below in detail.

First, according to the system taught in U.S. Pat. No. 4,789,928, in order to display the article to be sold or previewed, whether or not the desired used car is being offered for auction, a laser disk storing the necessary auction data, such as the auction starting time, name, external appearance, year, model, evaluation and distance traveled of the automobiles to be exhibited, must be distributed, by a private delivery service, to each dealer terminal by the day before the start of the auction. For this reason, it is virtually impossible to hold the auction more than once a week.

Further, since the laser disk with the preview information must be delivered to every dealer terminal, a large number, i.e., several thousands or tens of thousands, of laser disks must be pressed, resulting in a waste of time and money.

On the other hand, since the large volume of auction data and signals such as bid-up signals or the like are transmitted between the front computers and the dealer terminals through leased telecomnunication lines and commercial telephone lines, according to the system of U.S. Pat. No. 4,789,928, the speed of transmission is limited so that the time required for bidding on and selling one automobile is relatively long. Accordingly, data for a still picture of an automobile for sale cannot be transmitted during the actual auction time but instead must be read from the laser disk previously delivered. Data for an animated picture is even more difficult to transmit during the time of the auction.

In this system, moreover, audio data for on-the-spot broadcasting cannot be transmitted and, accordingly, it has been impossible to obtain an ambience which is unique and favorable for an auction.

Moreover, since the conventional system necessitates a connection to the commercial telephone line for accessing to the front computer to get the auction data, every dealer must pay for the line rental fee even during a so-called view-only period in which the dealer does not join an actual auction but only watches the same.

SUMMARY OF THE INVENTION

The present invention was made in view of the foregoing drawbacks accompanying the state of the prior art and, accordingly, an object of the invention is to provide an auction information transmission processing system which does not require the pressing and delivery of laser disks to a large number of dealer terminals before an auction day.

Another object of the invention is to provide an auction information transmission processing system capable of reducing the telephone line rental fee for the dealer terminals.

It is another object of the invention to provide an auction information transmission processing system capable of improving the signal transmission speed.

Still another object of the invention is to provide an auction information transmission processing system capable of transmitting data for animated pictures of automobiles for sale to each of the dealer terminals.

It is still another object of the invention to provide an auction information transmission processing system capable of transmitting audio data signal for on-the-spot broadcasting to every dealer terminal to obtain an ambience which is unique and generally favorable for an auction.

The above and other objects of the invention can be achieved by providing an auction information transmission processing system in an auction information transmission system which, according to the present invention, is constructed by connecting a single most significant front computer to a host computer, connecting a plurality of intermediate front computers and a plurality of least significant front computers to the most significant front computer in a tree-like configuration via communication lines, and connecting a plurality of dealer terminals to each of the least significant front computers via communication lines. The host computer connects to a satellite signal transmitter for transmitting auction data signals and other signals to a satellite through a satellite communication line, and each dealer terminal is provided with a satellite signal receiver for receiving the signals transmitted from the host computer through the satellite communication line.

The signals transmitted from the host computer to the dealer terminals through the satellite communication line include data peculiar to articles on exhibit at an auction, an audio signal, signals representing bidding-up price and sell-off price and the like. On the other hand, signals transmitted from each of the dealer terminals, such as a bid-up signal to the host computer, go through the surface communication line such as leased telecommunication lines and commercial telephone lines. Hence, the auction information transmission processing system according to the present invention constitutes a loop system circulating from the host computer to the dealer terminals through the satellite communication line and from the dealer terminals to the host computer through the surface communication lines.

DESCRIPTION OF THE PREFERRED EMBODIMENT

A preferred embodiment in which the auction information transmission processing system of the invention is applied to the auctioning of used cars, as an example, will now be described hereinbelow in detail with reference to the accompanying drawings.

Figure 1:
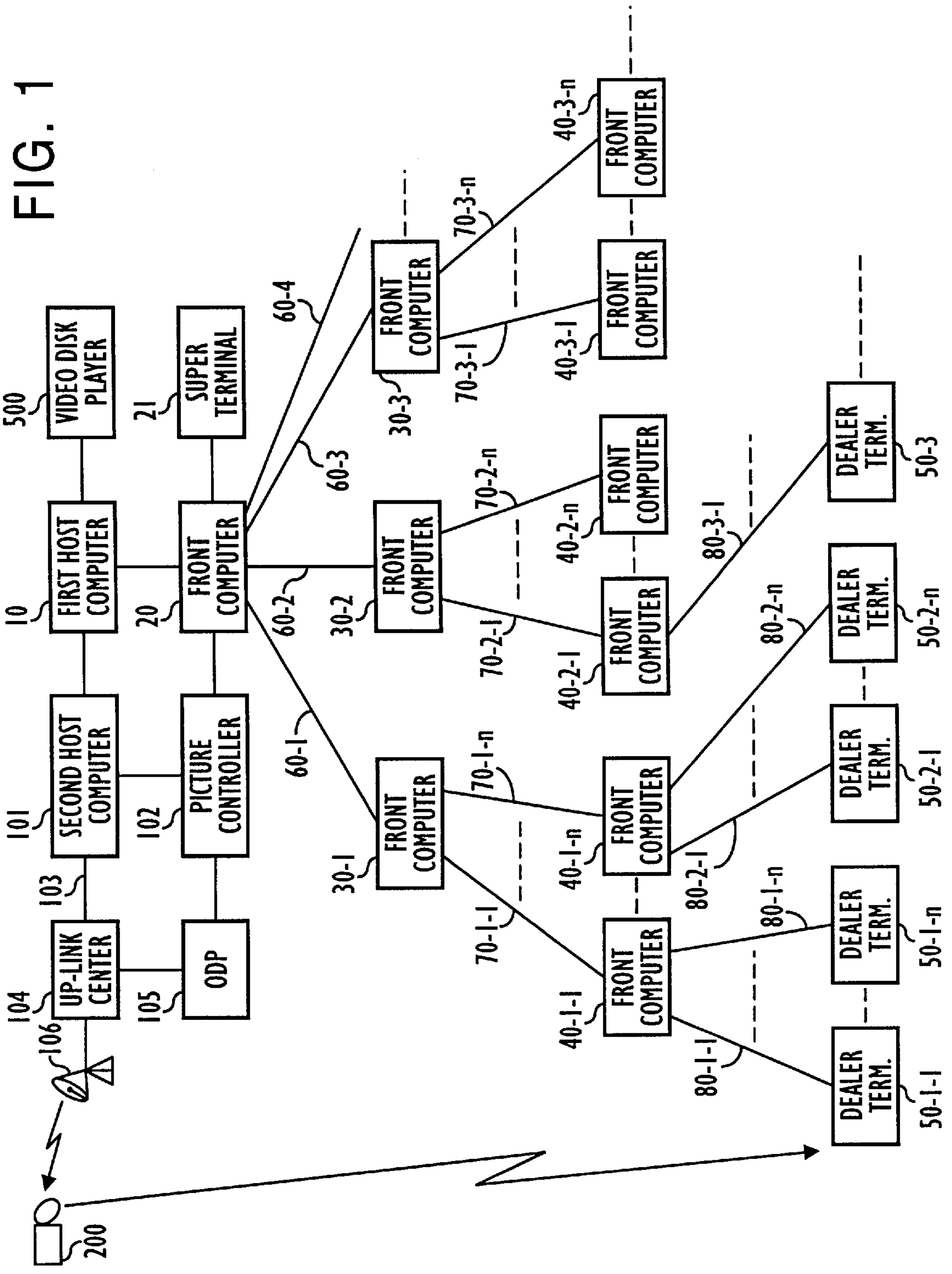
FIG. 1 is a block diagram illustrating the configuration of a used car auction information transmission system according to the present invention.

FIG. 1 is a block diagram illustrating the configuration of a used car auction information transmission loop system according to the present invention.

The auction information transmission system includes a first host computer 10 having a single most significant front computer 20 connected thereto. The system further includes a plurality of intermediate front computers 30-1, 30-2, 30-3, . . . connected to the most significant front computer 20 via leased telecommunication lines 60-1, 60-2, 60-3, . . . , respectively. A plurality of least significant front computers 40-1-1 through 40-1-n, 40-2-1 through 40-2-n, 40-3-1 through 40-3n . . . are connected to the intermediate front computers 30-1, 30-2, 30-3 . . . via leased telecommunication lines 70-1-1 through 70-1-n, 70-2-1 through 70-2-n, 70-3-1 through 70-3-n, . . . respectively. Thus, the most significant front computer 20, the intermediate front computers 30 and the least significant front computers 40 are connected in a tree-like configuration via the leased telecommunication lines 60 and 70.

A plurality of dealer terminals 50-1-1 through 50-1-n, 50-2-1 through 50-2-n, . . . are connected to the least significant front computers 40-1-1 through 40-1-n, 40-2-1 through 40-2-n, 40-3-1 through 40-3-n, . . . via commercial telephone lines 80-1-1 through 80-1-n, 80-2-1 through 80-2-n, . . . , respectively. A super terminal 21 is connected to the most significant front computer 20.

The first host computer 10 also connects to a second host computer 101 which connects to an UP-link center 104 through a leased telecommunication line 103. The second host computer 101 also connects to a picture controller 102 coupled to an optical data processor 105. Auction data such as picture and audio data and the like transmitted from the first host computer 10 are supplied to the UP-link center 104, which transmits the data to a communication satellite 200 (JC-SAT-1) via a parabolic antenna 106. Then the data are reflected by the satellite 200 toward each of the dealer terminals 50-1-1 . . . 50-1-n, 50-2-1 . . . 50-2-n, . . .

Figure 2:
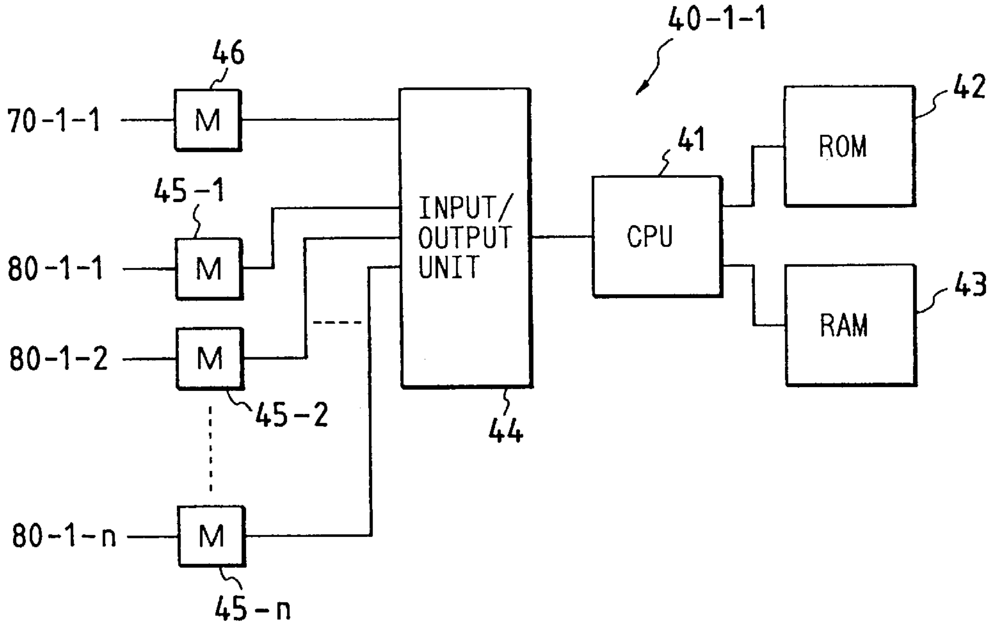
FIG. 2 is a block diagram illustrating the system configuration of a front computer.

FIG. 2 is a block diagram illustrating the system configuration of the least significant front computer 40-1-1. As shown in FIG. 2, the least significant front computer 40-1-1 includes a central processing unit (CPU) 41, a read-only memory (ROM) 42, a random-access memory (RAM) 43, and an input/output unit 44. A plurality of modems (M) 45-1 through 45-n and modem 46 are connected to the input/output unit 44. The leased telecommunication line 70-1-1 is connected to the modem 46, and the commercial telephone lines 80-1-1, 80-1-2, 80-1-n are connected to the modems 45-1, 45-2, 45-n, respectively. A variety of programs, described below, are stored in the ROM 42, and various data relating to management tables, described below, are stored in the RAM 43. Though FIG. 2 shows the system configuration solely of the front computer 40-1-1, the system configurations of the intermediate front computers 30-1, 30-2, 30-3, . . . and least significant front computers 40-1-2 through 40-1-n, 40-2-1 through 40-2-n, 40-3-1 through 40-3-n, . . . are substantially the same.

Figure 3:
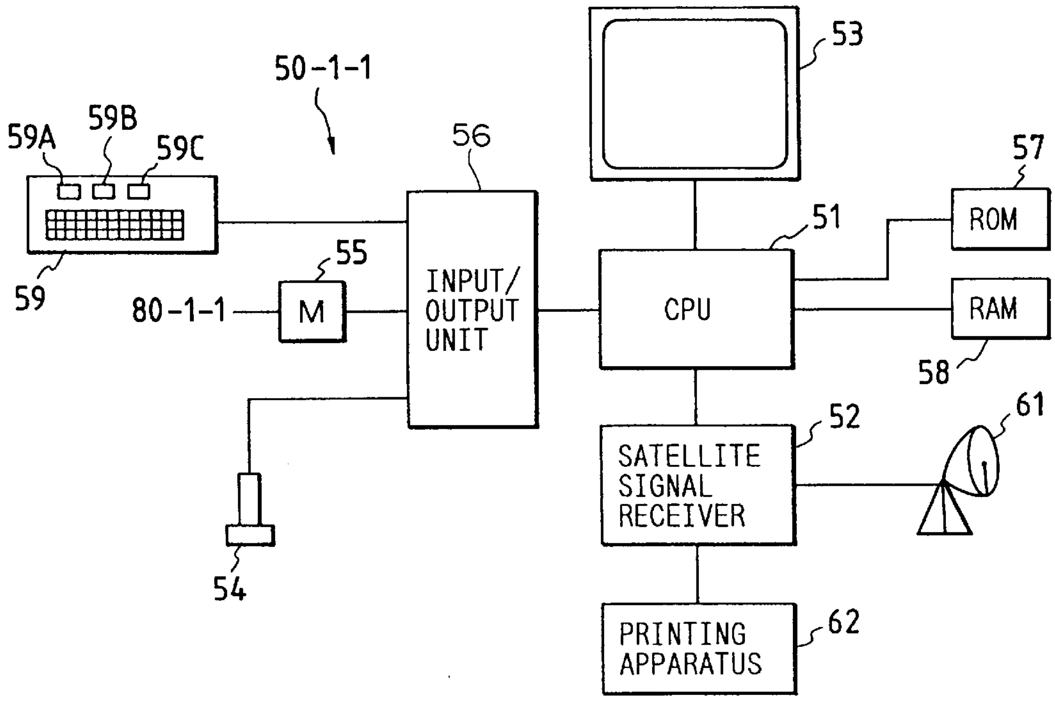
FIG. 3 is a block diagram illustrating the system configuration of a dealer terminal.

FIG. 3 is a block diagram illustrating the system configuration of the dealer terminal 50-1-1. As shown in FIG. 3, the dealer terminal 50-1-1 includes a central processing unit (CPU) 51, a satellite signal receiving and storing device 52 having a parabolic antenna 61, a display unit 53, a POS (point-of-sale) switch 54, an input/output unit 56, a read-only memory (ROM) 57, a random-access memory (RAM) 58, and a keyboard 59. The keyboard 59 is provided with a copy switch 59C, an ON-line switch 59A and an OFF-line switch 59B for actuating and turning off the modem 55, respectively. The dealer terminal 50-1-1 further includes a printing apparatus 62 such as a facsimile machine or a printer for printing out a sheet indicative of data of an article such as the name, external appearance, year, model, evaluation and distance traveled of the articles to be exhibited. The commercial telephone line 80-1-1 is connected to the central processing unit 51 via a modem (M) 51. The CPU 51 is provided with a comparing and adjusting section which adjusts delays of signals received from the satellite signal receiving apparatus 52 in compliance to the speed of signals from the keyboard 59 and the POS switch 54, so that the speed of signals is appropriately adjusted and transmitted to the intermediate significant front computer 40-1-1 through the modem 55.

Though FIG. 3 illustrates solely the system configuration of the dealer terminal 50-1-1, the other dealer terminals 50-1-2 through 50-1-n, 50-2-2 through 50-2-n, 50-3-1 through 50-3-n are of substantially the same configuration.

Figure 4:
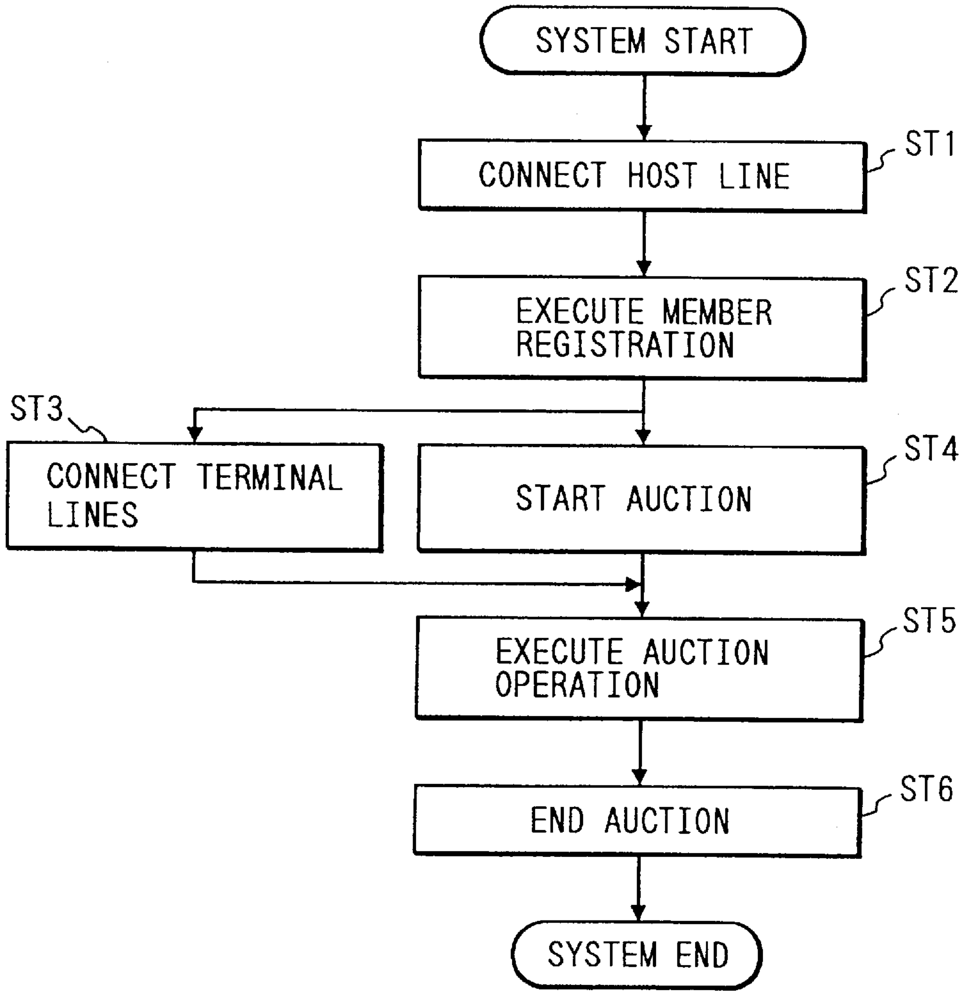
FIG. 4 is a flowchart illustrating the overall flow of auction processing.

Auction processing in the used car auction information transmission system of FIG. 1 is executed in the sequence shown in FIG. 4. The sequence is as follows: host line connection processing (step ST1), member registration processing (step ST2), dealer terminal IDs checking processing (step ST3), auction start processing (step ST4), auction operation processing (step ST5) and auction termination processing (step ST6).

Under these conditions, a command from the host computer 10 connects the most significant front computer 20 to the intermediate front computers 30-1, 30-2, 30-3, . . . via the leased telecommunication lines 60-1, 60-2, 60-3, . . . and connects the intermediate front computers 30-1, 30-2, 30-3, . . . to the least significant front computers 40-1-1 through 40-1-n, 40-2-1 through 40-2-n, 40-3-1 through 40-3-n, . . . via the leased telecommunication lines 70-1-1 through 70-1-n, 70-2-1 through 70-2-n, 70-3-1 through 70-3-n, respectively. This is the host line connection processing step ST7 of FIG. 4.

Next, the first host computer 10 transmits registered member I.D.'s to the least significant front computers 40-1-1 through 40-1-n, 40-2-1 through 40-2-n, 40-3-1 through 40-3-n. The member I.D.'s are stored in the RAMs (FIG. 2) of each of the least significant front computers 40-1-1 through 40-1-n, 40-2-1 through 40-2-n, 40-3-1 through 40-3-n, . . . to register the members. This is the member registration processing step ST2 of FIG. 4. The system then awaits calls from the dealer terminals 50-1-n, 50-2-1 through 50-2-n, 50-3-1 through 50-3-n.

Generally, each of these steps of the embodiment are substantially the same as those disclosed in U.S. Pat. No. 4,789,928. Accordingly, only the significant processes will be described with reference to FIG. 4.

The dealer terminals 50-1-1 through 50-1-n, 50-2-1 through 50-2-n, 50-3-1 through 50-3-n, . . . place calls to the least significant front computers 40-1-1 through 40-1-n, 40-2-1 through 40-2-n, 40-3-1 through 40-3-n, . . . and a connection is effected via the commercial telephone lines 80-1-1 through 80-1-n, 80-2-1 through 80-2-n, 80-3-1 through 80-3-n . . . . The dealer terminals then transmit their I.D.'s to the least significant front computers 40. Terminal line connections are made upon checking whether these member I.D.'s agree with the member I.D.'s stored in the RAMs 43 of the front computers 40-1-1 through 40-1-n, 40-2-1 through 40-2-n, 40-3-1 through 40-3-n. This is the dealer terminal ID's checking step 403 of FIG. 4, and the checking is performed by the host computer 10.

The host computer 10 then transmits an auction start signal to the dealer terminals 50-1-n, 50-2-1 through 50-2-n, 50-3-1 through 50-3-n, . . . to start the auction. This is the auction start processing step ST4 of FIG. 4.

Next, the host computer sends a signal to the dealer terminals 50-1-1 through 50-1-n, 50-2-1 through 50-2-n, 50-3-1 through 50-3-n through a satellite communication system constituted by the second host computer 101, picture controller 102, optical data processor 105, UP-link center 104, parabolic antenna 106 and satellite 200, whereby the auction data such as basic picture data, the used car data stored on a laser disk or the like located at the host computer, or audio signal are transmitted. Thus, specific auction data relating to the used cars available are displayed on the video display unit 53 (FIG. 3) and reproduced by a speaker of the display unit via the satellite signal receiving and storing device 52.

The last picture displayed on the screen is a prescribed seller picture at the exhibiting shop and a prescribed buyer picture at the other locations. Next, as will be described below, there is a transition to the auction operation. This is the auction operation step ST5 of FIG. 4. Lastly, the host computer 10 sends an auction termination signal to the dealer terminals 50-1-1 through 50-1-n, 50-2-1 through 50-2-n, 50-3-1 through 50-3-n, . . . , whereby the auction termination processing step ST6 of FIG. 4 is executed. The termination signal is sent from the host computer to each of the dealer terminals through either the surface communication line or the satellite communication line.

The invention is not limited to the member registration operation as described above, but another operation which does or does not utilize the satellite system is also applicable.

Hereinafter, the intermediate front computers 30-1, 30-2, 30-3, . . . shall be referred to generally as intermediate front computers 30, the least significant front computers 40-1-n, 40-2-1 through 40-2-n, 40-3-1 through 40-3-n, . . . as least significant front computers 40, the dealer terminals 50-1-1 through 50-1-n, 50-2-1 through 50-2-n, 50-3-1 through 50-3-n, . . . as dealer terminals 50, the leased telecommunication lines 60-1, 60-2, 60-3, . . . as leased telecommunication lines 60, the leased telecommunication lines 70-1-n, 70-2-1 through 70-2-n, 70-3-1 through 70-3-n, . . . as leased telecommunication lines 70, and the commercial telephone lines 80-1-n, 80-2-1 through 80-2-n, 80-3-1 through 80-3-n, . . . as commercial telephone lines 80.

When the auction operation is in progress, a buyer at each of the dealer terminals 50 observes the last picture of used car auction information displayed on the screen of the display unit 53 and presses the POS switch 54 (FIG. 3) to transmit a bid-up signal. If the buyer holds the POS switch 54 depressed, the bid-up signal is issued continuously. The manner in which the signal is issued is stored in the ROM 57. However, if a large number of dealer terminals 50 send bid-up signals to the host computer 10 simultaneously through the least significant front computers 40, intermediate front computers 30 and most significant front computer 20, the most significant front computer 20 and the host computer 10 will have to process a large quantity of data. Since this processing will require a long period of time, it will not be possible to perform the auction business on a real-time basis. Accordingly, it is required that some means be provided for allowing the front computers 20, 30, 40 to select only a predetermined number of bid-up signals and send these selected signals to a more significant computer. The manner of selecting only a predetermined number of bid-up signals and sending these selected signals to a more significant computer is the same as shown in U.S. Pat. No. 4,789,928.

Figure 5:
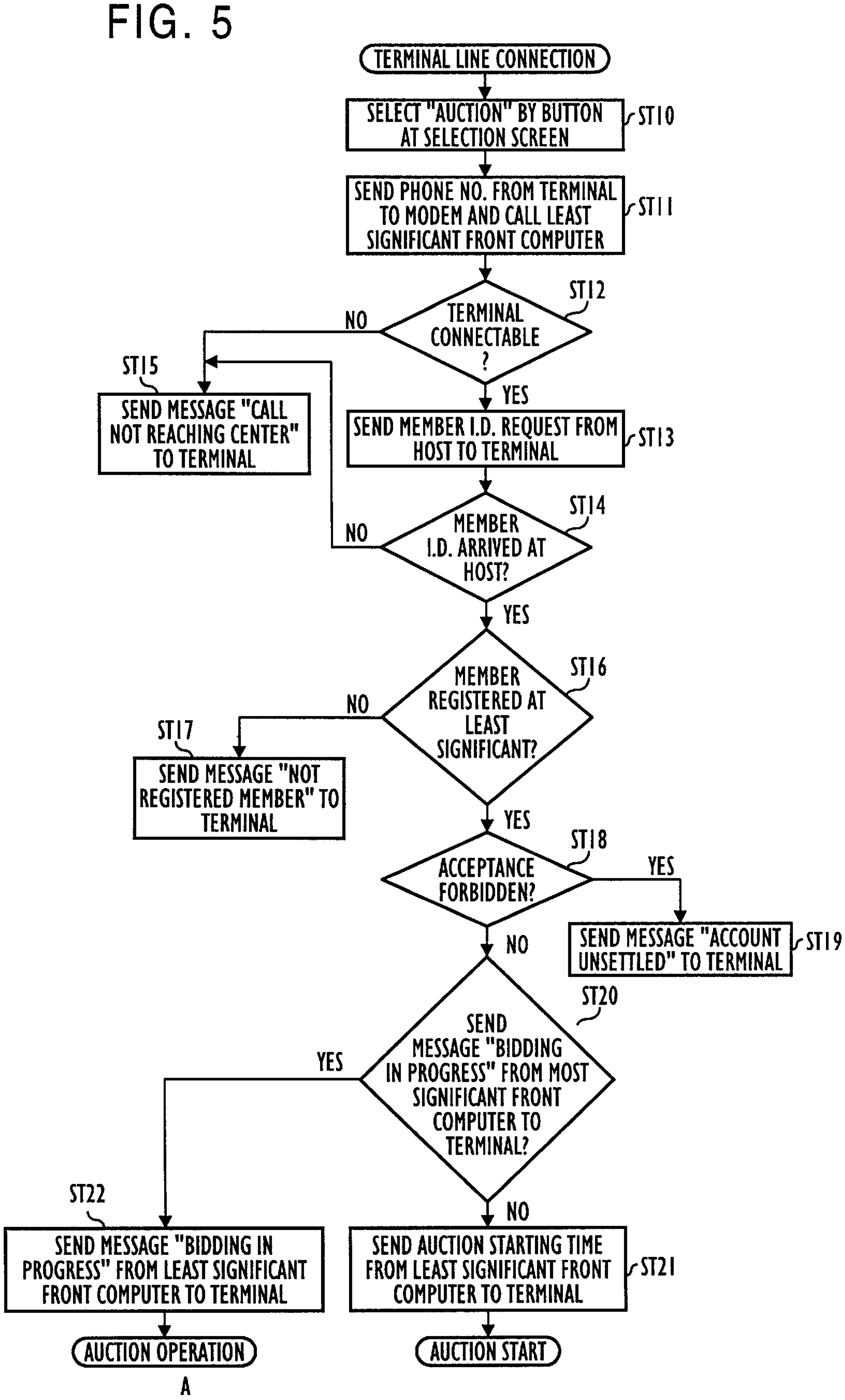
FIG. 5 is a flowchart illustrating the flow of terminal line connection processing for connecting dealer terminals to least significant front computers via commercial telephone lines.

FIG. 5 is a flowchart illustrating the flow of terminal line connection processing for connecting the dealer terminals 50 to the least significant front computers 40 via the commercial telephone lines 80. At each of the dealer terminals 50, auction is selected by button at a selection screen of the display unit 53 (step ST10) and telephone signals are sent from the dealer terminals 50 via the modems 55 (FIG. 3) to place calls to the least significant front computers 40 (step ST11).

The least significant front computers 40 determine at a step ST12 whether the dealer terminals 50 are in a connectable state. If a YES answer is received, the host computer 10 transmits data requesting member I.D.'s to the dealer terminals 50 (step ST13). In response, the dealer terminals 50 transmit their I.D.'s and it is determined at step ST14 whether these member I.D.'s have reached the host computer 10. If an I.D. has not arrived, a message such as CALL NOT REACHING CENTER is sent to the particular dealer terminal 50 at step 125. The same message is issued by a least significant front computer 40 when it is found at step ST12 that a dealer terminal 50 is not in a connectable state.

When member I.D.'s are found to reach the host computer 10 at the step ST14, it is determined at step ST16 whether these member I.D.'s agree with the members registered in the least significant front computers 40. If a NO answer is received at step ST16, data for issuing a message reading NOT REGISTERED MEMBER are transmitted to the dealer terminals 50 at step 127.

If a member is found to be registered in a least significant front computer 40 at step ST16, then it is determined at step ST18 whether the member is one whose acceptance is forbidden. If the member is one whose acceptance is forbidden, then data for issuing a message reading ACCOUNT UNSETTLED is transmitted to the dealer terminal 50 at step 129.

If the member is not one whose acceptance is forbidden, then it is determined at a step ST20 whether bidding is in progress. Since bidding will not be in progress at this point, the least significant front computers 40 send auction start time data to the dealer terminals 50, thereby displaying the time at which the auction is to start. The program then proceeds to auction start processing. If bidding is in progress at the step ST20, the least significant front computers 40 transmit data for displaying a picture reading BIDDING IN PROGRESS to the dealer terminals 50 (step ST22). The program then proceeds to auction operation processing.

Figure 6:
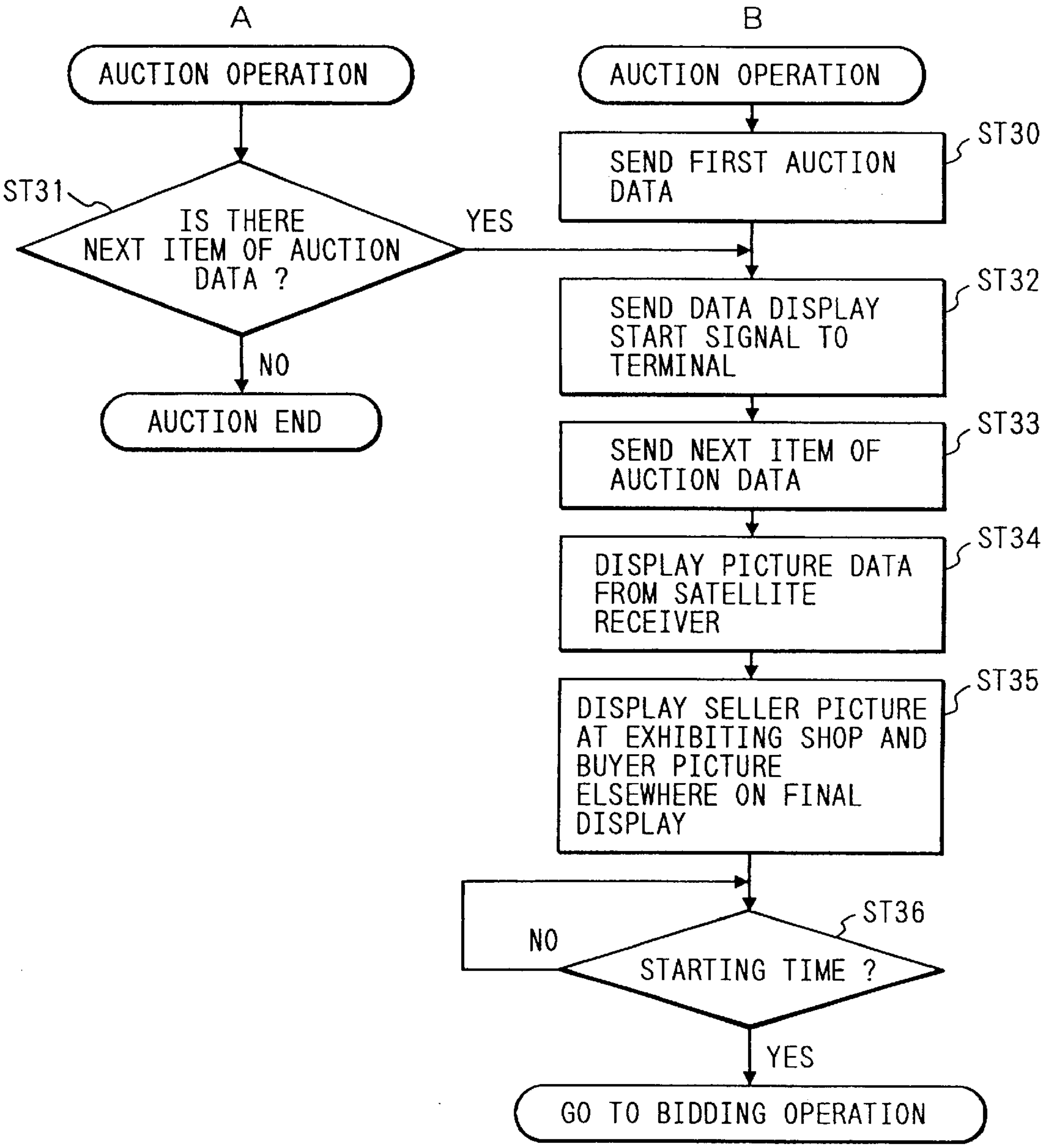
FIG. 6 is a flowchart illustrating the flow of auction operation processing.

FIG. 6 is a flowchart illustrating the flow of auction operation processing. When the auction start processing ends, the host computer 10 transmits first auction data through the satellite communication system at step ST30, sends a data display start signal to the dealer terminals 50 at step ST32, and then transmits the next item of auction data at step ST33. Each dealer terminal 50 receives auction data (pictures and characters) via the satellite signal receiving and storing device 52 thereof where the received signals are composed and adjusted to synchronize with the signal transmission through the surface communication system, and these data are displayed on the display unit 53 (step ST34). Next, a seller's screen appears as the final picture on the display unit 53 of the exhibiting shop's dealer terminal 50, and a buyer's screen is displayed at the other dealer terminals (step ST35).

Next, it is determined at step ST36 whether a bidding operation start time has arrived. If such time has arrived, the program proceeds to bidding operation processing. If a picture reading BIDDING IN PROGRESS has been sent from the least significant front computers 40 to the dealer terminals 50 at the step ST22 of terminal line connection processing shown in FIG. 5, then it is determined at step ST31 of FIG. 6 whether the next item of auction data is available. If the answer is YES, the program proceeds to step ST32; if NO, then the program proceeds to auction terminal processing.

In a bidding operation, the price is bid up at predetermined increments by the POS bid-up signals from the POS switches 54 (FIG. 3) of the dealer terminals 50. The program proceeds to sell-off processing when a seller issues a sell-off signal or when a sell-off price registered in advance by a seller is reached. In an actual bidding operation, however, the host computer 10 transmits bid-up signals at a predetermined period and the period is slowed down to improve the opportunity for obtaining a pledge. These sequential operations according to the invention are the same as those described in U.S. Pat. No. 4,789,928.

With the auction information transmission processing loop system according to the present invention, several modes are available as described below with advantages of the accompanying satellite communication system.

Preview and Stock-check Mode:

By the day before the start of the auction, a participant at each of the dealer terminals 50 may acquire the data relating to the used cars to be auctioned off. In this case, the first host computer sends a list indicating each used car for auction through the satellite communication line on the preceding day. The list is printed out by the printing apparatus 62 connected to the satellite signal receiver 52. A person who wishes to participate in a preview system at each of the dealer terminals, on the basis of the list of the cars to be sold, then accesses a laser disk installed in a video disk player 500 (FIG. 1) associated with the host computer 10 to display the aforementioned auction data, i.e., the name, external appearance, year, model, evaluation and distance traveled of the automobiles to be exhibited. In this way the participant can get a preview of whether or not the desired used car is being offered for auction. During the preview and stock-check mode, the operator can search for the desired article by inputting a code number via the keyboard 59 which code is identical with the identification number of the article.

Further, if the participant wishes to get a sheet showing the data, the data can be printed out by the printing apparatus 59 by depressing the copy switch 59C on the keyboard 59.

In this mode, the participant who wants to preview the auction data first calls the least significant front computer 40 through a modem 55 attached to his or her dealer terminal 50 and connected to the commercial telephone line 80. His or her ID number is checked with the data stored in the least significant front computer 40 to determine whether the dealer terminal 50 is permitted to receive data from the host computer 10. If the dealer terminal 50 is permitted to receive data, the auction data transmitted from the host computer 10 through the satellite communication system is received by the receiver 52 connected to the dealer terminal 50 to achieve the preview.

The participant at the dealer terminal 50 can select a long display of desirable articles by entering commands input by a keyboard coupled to the dealer terminal without continuing to use the commercial telephone line 80.

View-only Mode:

During the actual auction, a participant can merely watch the procedure of the auction if he desires without joining the auction. In this mode, i.e., view-only mode, the initial accessing and ID permitting processes are the same as those in an auction joining mode described below. After the accessing and ID permitting processes are completed, the dealer terminal can disconnect the commercial telephone line 80 by depressing "OFF-line" key 59B of the keyboard 59 while continuing to receive the auction data transmitted through the satellite communication line. Hence the view-only mode can be accomplished, thus saving the rental fee for the commercial telephone line.

During the view-only mode, if the participant wishes to join the auction, he or she merely depresses the ON-line switch 59A assembled on the keyboard 59 to access the least significant front computer 40. After the necessary ID check, the dealer terminal 50 becomes available for sending the bid-up signal from the POS switch 54 to the front computer.

The participant can return to the view-only mode by merely depressing the OFF-line switch 59B thereby disconnecting the commercial telephone line 80.

Figure 7:
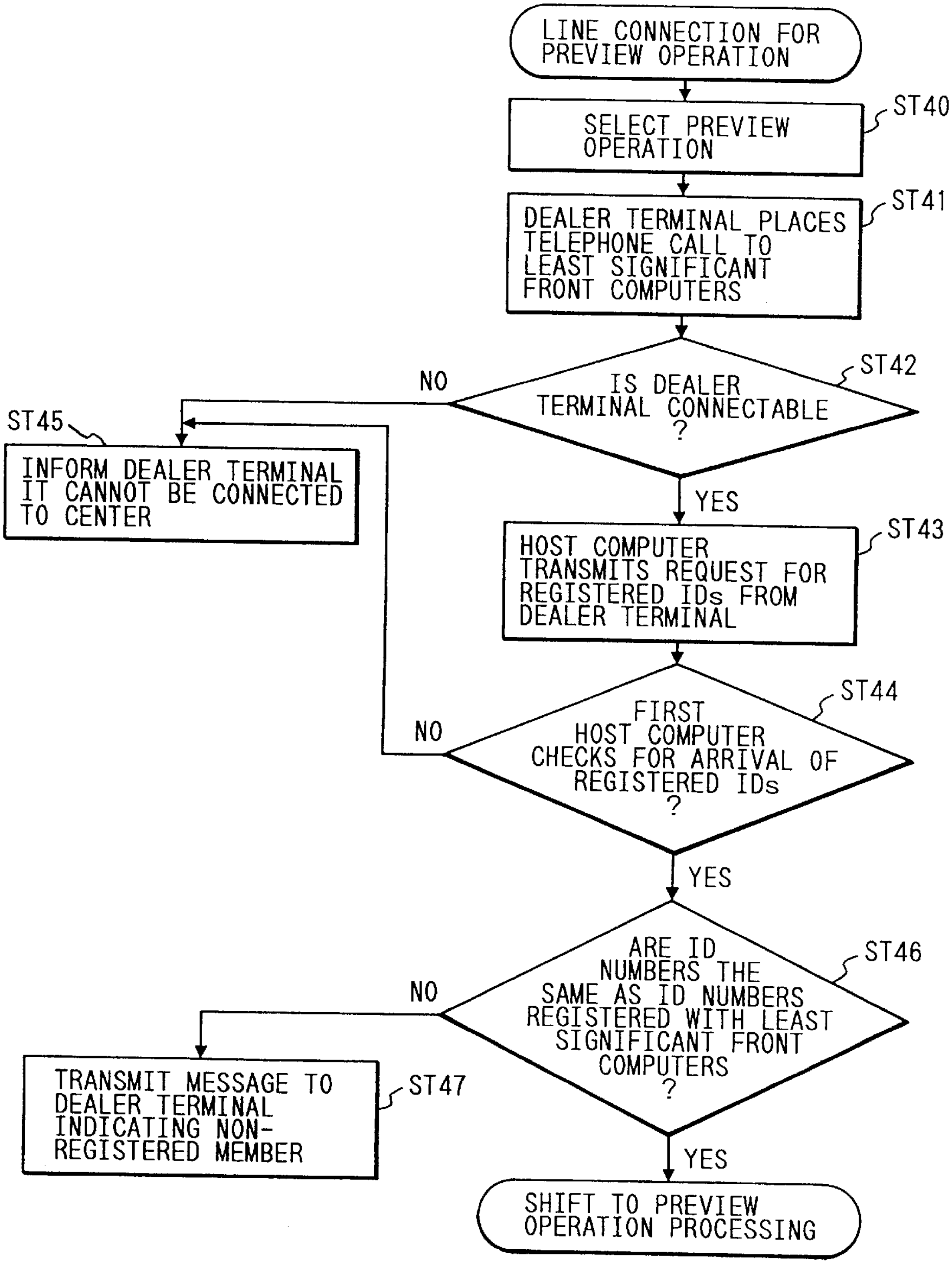
FIG. 7 is a flowchart illustrating the flow of the line connection processing for a preview operation.

FIG. 7 is a flow chart of a line connection processing to be performed in the preview operation. In the respective dealer terminals 50, a preview operation is selected on the selection screen of the display device 53 (Step ST40), and a telephone call is made from the dealer terminals 50 to the least significant front computers 40 (Step ST41).

The least significant front computers 40 check whether the dealer terminals 50 are in the connectable condition or not (Step ST42) and, if yes, then the first host computer 10 transmits to the dealer terminals 50 data which request the registered member IDs therefrom (Step ST43). In response to this, the dealer terminals 50 transmit their respective registered members IDs to the first host computer 10. The first host computer 10 checks whether the registered members ID's have arrived at the first host computer 10 or not (Step ST44) and, if not, then the first host computer 10 issues to the associated dealer terminals 50 a message indicating that it cannot be connected to the center (Step ST45).

In the above-mentioned step ST42, when the dealer terminals 50 are not connectable to the least significant front computers 40, a similar message is issued from the front computers 40 to the associated dealer terminals 50. In the above step ST44, when it is found that the registered members ID's have arrived at the first host computer 10, then the host computer 10 checks whether the arrived registered members ID's are identical with the members ID's that are registered in the least significant front computers 40 or not (Step ST46). If not, then the host computer 10 transmits to the associated dealer terminals 50 a message indicating that it is not registered as a member (Step ST47).

In the above step ST46, when the members ID's are found registered in the least significant front computers 40, the processing is shifted to a preview operation processing.

Figure 8:
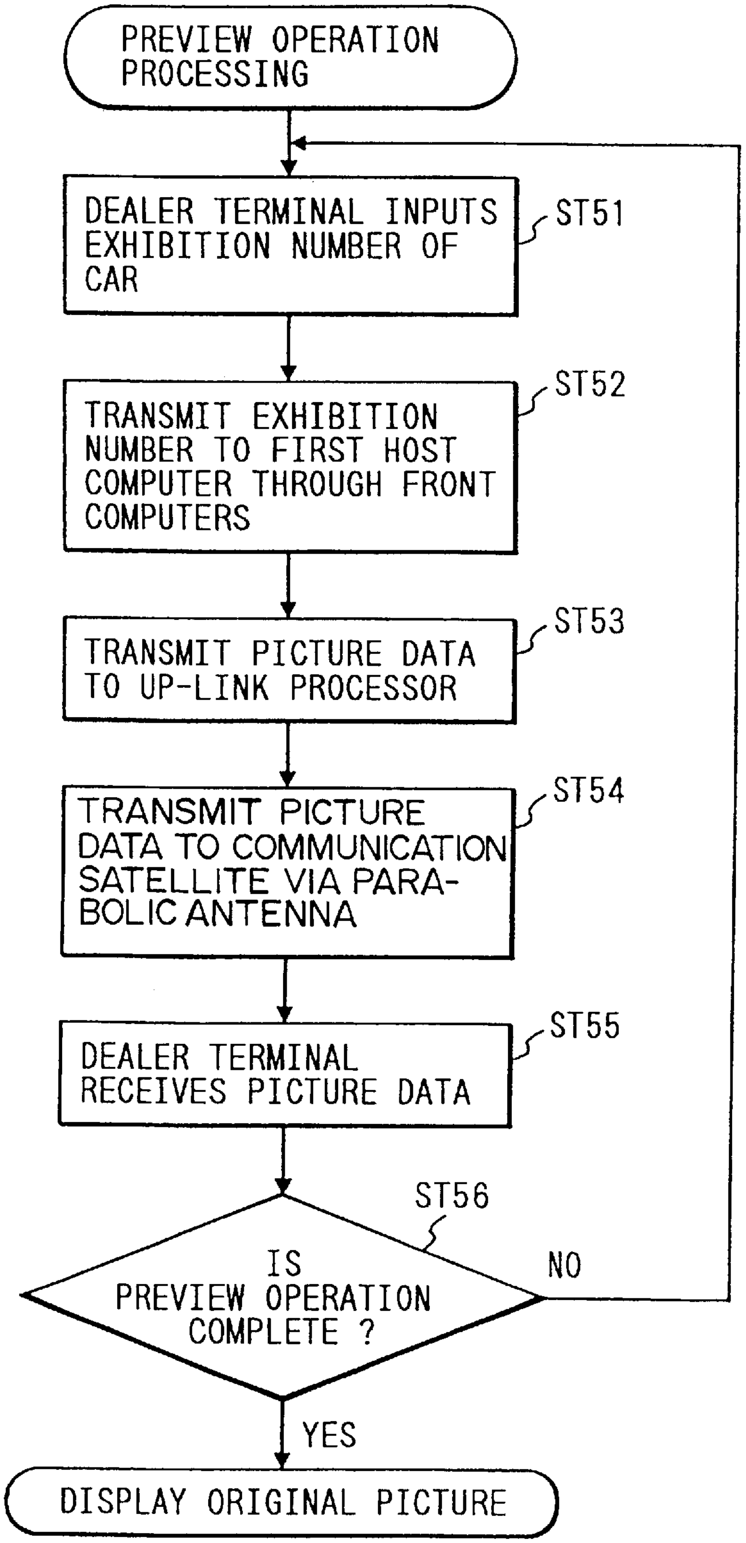
FIG. 8 is a flowchart illustrating the flow of a preview operation.

FIG. 8 is a flow chart of the preview operation processing. If the dealer terminal 50 inputs the exhibition number of the preview car (Step ST51), then the exhibition number is transmitted to the first host computer 10 through the least significant computer 40, middle significant computer 30 and most significant front computer 20 (Step ST52). The first host computer 10 transmits the exhibition number to the second host computer 101. In response to this, the second host computer 101 transmits the data to the up-link processor 104 and also transmits the picture data of the exhibition number to the optical data processor 105 through the picture controller 102. Then, the optical data processor 105 transmits the picture data to the up-link processor 104 (Step ST53).

Next, the up-link processor 104 transmits the picture data through the parabola antenna 106 to the communication satellite (Step ST54). The satellite signal receiver 52 of the dealer terminal 50 receives the picture data of the exhibition number through the parabola antenna 61 (Step ST55), and displays the picture data on the display device 53. If necessary, the picture data can be printed by the printing device. After that, it is checked whether the preview operation is completed or not (Step ST56) and, if yes, then the display device 53 is returned to its initial picture.

Auction Participating Mode:

When the participant wishes to join the actual auction, he or she maintains the connection of his or her dealer terminal 50 to the least significant front computer 40 through the modem 55 connected to the commercial telephone line 80, and pushes the POS switch 54 if it is desired to purchase the displayed article. The operation of the POS switch 54 is as described above. The operations and signal transmission in this mode of the instant invention are substantially the same as those taught in U.S. Pat. No. 4,789,928. However, several signals such as the auction start signal, auction termination signal, bid-up signal, and sell-off signal are transmitted to each of the terminals through either the surface communication line or the satellite communication line. When the dealer terminal receives the same signal both through the surface and satellite communication lines, the signal received through the surface communication line is given priority.

Combination Mode:

The system of the invention is also available for an on-the-spot auction in which the dealer terminals receive a television signal of auction data taken by a camera at an actual auction site. In this case, no laser disk or other data storage device is necessary because the camera is set at the stage of the auction site at which many buyers gather to purchase desired used cars. At the actual auction site, the buyers watch the actual used cars or a large screen displaying the cars and hold a POS switch. The purpose, structure and function of the POS switch is the same as that connected to the dealer terminal 50. With this mode, both the buyers at the auction site and the participants in front of the dealer terminals join one auction, and push the respective POS switch to bid-up the price of the subject used car.

In accordance with the illustrated embodiment as described above, an auction information transmission processing system is constructed by connecting the single most significant front computer 20 to the host computer 10, connecting the plurality of intermediate front computers 30 and the plurality of least significant front computers 40 to the most significant front computer 20 via the leased telecommunication lines 60 and 70 in a tree-like configuration, and connecting the plurality of dealer terminals 50 to each of the least significant front computers 40 via the commercial telephone lines 80. Further, the host computer 10 transmits auction data and other signals to each dealer terminal 50 via the satellite communication system constituted by the second host computer 101, picture controller 102, optical data processor 105, UP-link center 104 and satellite 200. As a result, the system constitutes a loop system which can be utilized with ease without widely scattered auction participants gathering at a single location.

Though the above-described embodiment relates to an auction of used cars, the auction information transmission processing system is not limited to used cars but can also be applied to the auctioning of various articles such as flowers, arts and the like.

According to the present invention, it is not necessary to press and deliver a large number of laser disks for storing the necessary auction data, such as the auction starting time, name, external appearance, year, model, evaluation and distance traveled of the automobiles to be exhibited by the day before the start of the auction in order to display the article to be sold or preview whether or not the desired used car is being offered for auction. Instead, merely one laser disk for the host computer is necessary. Therefore, the auction can be held if desired even several times a week. Also in the case of the combination mode as mentioned above, no laser disk is required.

Further, since only the signals such as bid-up signals or the like are transmitted through leased telecommunication lines and commercial telephone lines according to the invention, the speed of transmission is not so limited that time required for bidding and selling out one automobile cannot be shortened to approximately 25 seconds per article.

Still further, since the system of the invention utilizes the satellite communication system, data for not only still pictures but also animated pictures of an article for sale, and even on-the-spot broadcasting signals, can be transmitted during the actual auction. Therefore, it is possible to obtain an ambience which is unique and generally conducive to an auction.

Moreover, since the commercial telephone line can be disconnected during the view-only mode, according to the present invention, the rental fee for the commercial telephone line can be saved.

Further, in the aforementioned embodiment, the host computer transmits data through the satellite communication line stored in laser disks for storing the article data and other auction data. However, the method through which these data are stored is not limited to the above. A variety of storage means, such as magnetic storage devices, can be used as a matter of course.

Moreover, each of the front computers selects only a predetermined number of the bid-up signals within a predetermined period of time and these signals are sent to the front computers of higher significance. This results in a further reduction in the amount of data processed among the front computers, thereby shortening even further the time needed for data transmission processing. Accordingly, auction participants scattered over a wide area need not gather at a predetermined location, as in the prior art, and these persons can participate on a real-time basis without leaving their own locations.

As many apparently widely different embodiments of the present invention can be made without departing from the spirit and scope thereof, it is to be understood that the invention is not limited to the specific embodiments thereof.

What we claim is:

1. An auction information transmission system, comprising:

a first host computer generating auction data signals;

a single most significant front computer connected to said first host computer;

a plurality of front computer means each connected to said most significant front computer;

a second host computer connected to said first host computer for receiving therefrom said auction data signals;

satellite signal transmitting means connected to said second host computer for transmitting satellite signals comprising said auction data signals to a satellite; and a plurality of dealer terminal means each respectively connected to said plurality of front computer means through a ground communication line and including means for receiving said satellite signals containing auction data signals transmitted through said satellite by said satellite signal transmitting means, wherein each of said dealer terminal means selects one of (1) a preview mode where said dealer terminal means receives the auction signals from said first host computer transmitted both through the ground communication line and the satellite communication line, (2) a view-only mode where said dealer terminal means receives only the auction data transmitted through the satellite communication line, (3) an auction participating mode where said dealer terminal means receives the auction signals from said first host computer transmitted both through the ground communication line and the satellite communication line and transmits signals to the front computer through the ground communication line, and (4) a combination mode where said dealer terminal receives a television signal of auction data taken by a camera at an actual auction site through the satellite communication line and transmits signals to the front computer through the ground communication line.

2. The auction information transmission system according to claim 1, wherein each of said dealer terminal means comprises:

a control unit;

a display apparatus connected to said control unit;

an input/output unit connected to said control unit;

said means for receiving said satellite signals being connected to said control unit;

a POS switch connected to said input/output unit for inputting a bid-up signal;

a modem connected to said input/output unit for connecting said associated dealer terminal means to said front computer means through said ground connection line; and a keyboard connected to said input/output unit for inputting an operator's command.

3. The auction information transmission system according to claim 2, wherein said control unit comprises means for adjusting delay in said satellite signals.

4. The auction information transmission system according to claim 1, wherein each of said dealer terminals further includes output means for outputting data in accordance with said received auction data signals.

5. The auction information transmission system according to claim 4, wherein said output means comprises a printer.

6. The auction information transmission system according to claim 4, wherein said output means comprises a facsimile machine.

7. The auction information transmission system according to claim 1, wherein said most significant front computer is connected to said front computer means through leased telecommunication lines.

8. The auction information transmission system according to claim 1, wherein said dealer terminal means is connected to said front computer means through commercial telephone lines.

9. The auction information transmission system according to claim 1, wherein said satellite signal transmitting means comprises a picture controller connected to said second host computer, an optical data processor coupled to said picture controller, an UP-link apparatus coupled to said optical data processor and said second host computer, and an antenna connected to said UP-link apparatus.

10. The auction information transmission system according to claim 1, wherein said auction data signals comprise picture data and character data.

11. The auction information transmission system according to claim 10, wherein said auction data signals further comprise audio data.

12. The auction information transmission system according to claim 1, wherein said front computer means comprises a plurality of intermediate front computers connected to said most significant front computer via leased telecommunication lines and a plurality of least significant front computers connected to respective ones of said intermediate front computers via leased telecommunication lines, each of said least significant front computers connecting to said dealer terminal means through commercial telephone lines.

13. The auction information transmission system according to claim 1, wherein said satellite signal receiving means of each of said dealer terminal means comprises a parabolic antenna.

14. The auction information transmission system according to claim 1, wherein said first host computer comprises a laser disk reproducing apparatus.

* * * * *